United States Patent Office 3,054,792
Patented Sept. 18, 1962

---

3,054,792
NEW TRIAZINO NITRO DYESTUFFS
Harold Thompson Howard, Frank Hayhurst Slinger, and James Wardleworth, all of Manchester, England, assignors to Imperial Chemical Industries Limited, London, England, a corporation of Great Britain
No Drawing. Filed Mar. 16, 1959, Ser. No. 799,429
Claims priority, application Great Britain June 15, 1956
1 Claim. (Cl. 260—247.1)

This application is a continuation-in-part of our application Serial No. 662,023, now abandoned, filed in the United States on May 28, 1957 and in Great Britain on June 15, 1956.

This invention relates to new nitro dyestuffs having no solubility or only sparing solubility in water and more particularly it relates to such new nitro dyestuffs containing a 1:3:5-triazinyl-(2)-amino group.

According to the invention there are provided the nitro dyestuffs of the formula:

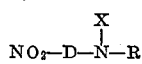

wherein D stands for a naphthalene or benzene nucleus which may be further substituted, wherein the nitrogen atom N is in the ortho position to the nitro group, X stands for hydrogen or for a hydrocarbon radical which may be substituted, R stands for hydrogen or for an organic radical attached to the nitrogen through a carbon atom, and wherein R may be connected to X when X is a hydrocarbon radical or to D, in the ortho position to the nitrogen atom N, to form a heterocyclic ring, which new nitro dyestuffs are free from sulfonic acid groups and are further characterised in that they contain at least once the group:

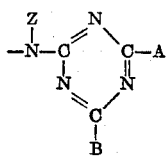

wherein A stands for halogen, B stands for aryl, alkyl, halogen, alkoxy, aryloxy, alkylthio, arylthio, hydroxy, mercapto, amino or substituted amino and Z stands for hydrogen or for a hydrocarbon radical which may be substituted.

As examples of substituents which inter alia may be present in the phenyl or naphthyl nucleus D there may be mentioned the substituents of the formula aryl-Y- wherein the aryl group may contain substituents and where —Y— stands for a direct link or a divalent linking group for example —NR'—, —SO$_2$—, —S—, —O—, —SO$_2$NR'—, —NR'SO$_2$—, —CONR'—, —NR'—CO—, —CO—, —CH$_2$—, or —CH=CH—, wherein R' stands for hydrogen or a hydrocarbon radical which may be substituted.

The organic radicals represented in the above formula by R comprise alkyl, aralkyl, cycloalkyl, aryl and heterocyclic radicals which may be substituted by the substituents hereinafter defined.

The hydrocarbon radicals represented by R', X and Z in the above formulae comprise alkyl, aralkyl, cycloalkyl, and aryl radicals which may be substituted by the substituents hereinafter defined.

There may also be present in the phenyl or naphthyl nucleus D, in any aryl nucleus of the group represented by aryl-Y-, or in any aryl nucleus present in an organic radical or hydrocarbon radical represented by X, Z, R or R' substituents such as alkyl, for example methyl and ethyl, —COOH, —CON(R")$_2$, —CN, —COOR", —SO$_2$N(R")$_2$, —COR", —CF$_3$, halogen, for example chlorine and bromine, —SO$_2$OR", —NO$_2$, —SO$_2$R", —OR", —OH, —N(R")$_2$, —NR"COR", and —NR"SO$_2$R" where R" stands for alkyl, cycloalkyl, aralkyl, or aryl, it being understood that more than one such substituent may be present; and that where R" occurs more than once in any substituent the groups represented by R" may, within this definition, be the same or different, or may be alkyl or substituted alkyl groups joined together in such a manner as to form, with the nitrogen atom, a heterocyclic ring.

As examples of substituents which may be present in alkyl radicals present in an organic radical or hydrocarbon radical represented by X, Z, R or R' there may be mentioned hydroxy, cyano and halogen, for example fluorine and chlorine.

In the new nitro dyestuffs of the invention where R is connected to X or to D in the ortho position to the nitrogen atom N to form a heterocyclic ring, the radical R may be such that the heterocyclic ring so formed may contain more than one hetero atom for example it may contain one or more nitrogen, sulphur and/or oxygen atoms in addition to the nitrogen atom N. As examples of heterocyclic ring systems which may thus be formed by attachment of R to X, we mention morpholine and piperazine, and as examples of heterocyclic ring systems which may be formed by attachment of R to D we mention phenoxazine, phenothiazine and acridone.

Thus as examples of alkyl and substituted alkyl radicals which may be represented by X, Z, R and R' there may be mentioned methyl ethyl, β-hydroxyethyl, β-chloroethyl, and β-cyanoethyl; as examples of aralkyl and substituted aralkyl represented by X, Z, R and R' there may be mentioned benzyl and p-chlorobenzyl; as examples of cycloalkyl and substituted cycloalkyl which may be represented by X, Z, R and R' there may be mentioned cyclohexyl and 2-methylcyclohexyl; as examples of aryl and substituted aryl which may be represented by X, Z, R, R' or which may be present in the group represented by aryl-Y- there may be mentioned phenyl, p-aminophenyl and m-aminophenyl, and as examples of heterocyclic radicals which may be represented by R there may be mentioned 2:4-dichloro-1:3:5-triazinyl, 2-benzthiazolyl, and 2-benzoxazolyl.

As examples of halogen which may be represented by A and B in the above formula there may be mentioned chlorine and bromine. As examples of other groups which may be represented by B there may be mentioned as examples of alkoxy, methoxy and ethoxy; as examples of aryl, phenyl and p-methylphenyl; as examples of alkylthio, methylthio and butylthio; as an example of substituted amino, beta-hydroxyethylamino; as an example of arylthio, p-tolylthio; and as examples of aryloxy, phenoxy and p-chlorophenoxy.

Whilst all of the above dyestuffs are within the spirit and scope of this invention, a highly valuable class of dyestuffs are those which have the formula:

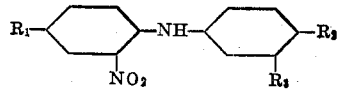

wherein one of R$_2$ and R$_3$ is selected from the class consisting of hydrogen and N-(hydroxy lower alkyl) sulfamyl, and the other of R$_2$ and R$_3$ is a radical of the formula:

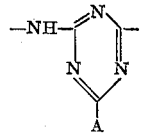

wherein A is selected from the group consisting of chlorine, lower alkoxy, monocyclic aryl, monocyclic aryloxy, amino, lower alkylamino, hydroxy-lower alkylamino, C-(hydroxy-lower alkoxy) lower alkylamino, N,N-di(lower alkyl)amino, N-(hydroxy-lower alkyl)-lower alkylamino, and N,N-di(hydroxy-lower alkyl)amino; and $R_1$ is an organic substituent as particularly exemplified by the radicals nitro, acetyl, cyano, sulfondimethylamido, sulfon-β-hydroxy-ethylamido, methane sulfonyl, trifluoromethyl, carbonanilido, carboncyclohexyl-amido, and morpholino.

In the above statement, by lower alkyl is meant alkyl groups having from 1 to about 6 carbon atoms. For instance, examples of groups falling within the phrase "N-(hydroxy lower alkyl) sulfamyl" includes such groups as N-(hydroxyethyl)sulfamyl, N-(hydroxybutyl) sulfamyl and N-(hydroxyhexyl)sulfamyl; similarly the phrase lower alkoxy embraces radicals such as methoxy, ethoxy, butoxy and pentoxy; and the phrases lower alkylamino and N,N-di-(lower alkyl)amino include, for example, methylamino, ethylamino, iso-propylamino, n-hexylamino, N,N-dimethylamino, N-ethyl-N-butylamino, etc.; and the phrases hydroxy lower alkylamino, N-(hydroxy-lower alkyl)-lower alkylamino, and N,N-di(hydroxy-lower alkyl)amino embrace such radicals as hydroxyethylamino, hydroxybutylamino, hydroxyhexylamino, N-(hydroxyethyl)methylamino, N-(hydroxypropyl)propylamino and N-(hydroxyamyl)ethylamino. In addition it is to be understood that the phrase monocyclic aryl is directed to radicals of aromatic hydrocarbons of the benzene series, including those wherein hydrogen of the benzene ring is replaced by a lower alkyl or cycloalkyl group. Generally speaking, dyestuffs having the general structure indicated above, but variously containing these individual radicals will show a community of dyeing properties in their common possession of a similar chromophoric grouping and of the halogeno-triazine radical, and in their non-solubility or sparing solubility in water which makes them particularly suitable for the dyeing or printing of textile materials as described hereinafter. The new nitro dyestuffs may be obtained by interacting a halogeno-1:3:5-triazine of the formula:

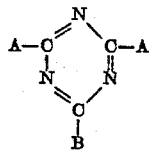

wherein A and B have the meanings stated above, with a nitro compound of the formula:

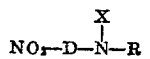

wherein D, N, X and R have the meanings stated above, which contains at least one amino group of the formula —NH.Z wherein Z has the meaning stated above.

As examples of nitro compounds which may be used in the above process there may be mentioned 2:4-dinitro-3'- and 4'-aminodiphenylamines, 2-nitro-4'-amino-4-acetyldiphenylamine, 2-nitro-4'-amino-4-sulphondimethylamidodiphenylamine, 2-nitro-4'-amino-4-carbonanilidodiphenylamine, 2-nitro-4'-amino-4-carboncyclohexylaminodiphenylamine, 2-nitro-4'-amino-4-cyanodiphenylamine, 2-nitro-4'-amino-4 - sulphon-β-hydroxyethylamidodiphenylamine and 2-nitro-4'-amino - 4 - trifluoromethyldiphenylamine. These nitro compounds may be obtained by the reaction of the appropriately substituted 2-nitrochlorobenzene with m- or p-phenylenediamine in alcoholic media, for example in ethanol or in β-ethoxyethanol, in presence of an acid binding agent for example sodium bicarbonate or sodium carbonate.

Other examples of nitro compounds which may be used in the process of the invention which may be mentioned are 2-nitro-4'-β-aminoethylsulphonyldiphenylamine, 2-nitro-4-β-aminoethylsulphonamidodiphenylamine, 2-nitro-4-amino-N-cyclohexylaniline, 3-nitro - 4 - morpholinoaniline, 3-nitrophenoxazine, 1-nitro-8-aminoacridone and 5'-amino-N-2'-nitrophenylbenziminazole.

As examples of halogeno-1:3:5-triazines which may be used in the process of the invention there may be mentioned cyanuric chloride, 2:4-dichloro-6-methoxy-1:3:5-triazine, 2:4-dichloro-6-phenoxy-1:3:5-triazine, 2:4-dichloro-6-phenyltriazine, 2:4-dichloro-6-(β-hydroxyethylamino-)1:3:5-triazine and 2:4-dichloro-6-methylthio-1:3:5-triazine.

The interaction between the halogeno-1:3:5-triazine and the nitro compound is preferably carried out in a solvent for the nitro compound, preferably an organic solvent, for example acetone or dioxane, which is a solvent for both the nitro compound and for the halogeno-1:3:5-triazine. Sometimes there may be used a mixture of such a solvent with water.

The interaction is preferably carried out at a low temperature which will depend mainly on the medium and the halogeno-1:3:5-triazine used. When cyanuric chloride in a medium containing water is used it is preferred to carry out the interaction at a temperature below 15° C., but in anhydrous media higher temperatures may be used. With a di-halogeno-1:3:5-triazine, however, it is preferred to carry out the reaction at a temperature below 85° C. in a medium containing water though still higher temperatures may be used in anhydrous media.

If desired, there may be added acid binding agents, for example sodium carbonate, sodium bicarbonate or potassium acetate, to the medium.

The products of reaction of the nitro compounds with cyanuric halides may be further reacted with amines, for example ethanolamine or with the alkali metal salts of phenols for example sodium phenate in water or acetone medium at moderate temperatures, for example at a temperature of 40° C. to give products identical with those obtained by reacting the nitro compounds with the di-halogeno-1:3:5-triazines obtained by reacting cyanuric halides with the corresponding amine or with an alkali metal salt of the corresponding phenol, for example with 2:4-dichloro-6-(β-hydroxyethylamino-)1:3:5 - triazine or with 2:4-dichloro-6-phenoxy-1:3:5-triazine.

In order that side reactions, for example hydrolysis, of the halogen atom or atoms remaining attached to the triazine ring are minimised during manufacture and storage, it is generally preferable to isolate the new nitro dyestuffs from the media in which they have been formed at a pH from 6 to 8, and to dry the resultant dyestuff pastes at relatively low temperature, for example between 20° C. and 40° C., preferably in the presence of buffering agents suitable for maintaining a pH value of about 6.5. Examples of such buffering agents are mixtures of disodium hydrogen phosphate and sodium dihydrogen phosphate or of sodium hydrogen phosphate and potassium dihydrogen phosphate.

The dyestuffs of this invention may be used in the form of a finely-divided aqueous dispersion for the dyeing and printing of wool, silk and textile materials containing artificial fibres, for example fibres made from polyamides such as polyhexamethylene adipamide and the polymer obtained from caprolactam, from cellulose esters for example cellulose acetate and cellulose triacetate, from polyurethanes and from linear aromatic polyesters for example polyethylene terephthalate.

By the above processes there are obtained yellow, orange and red-brown colourations having high light-fastness and fastness to wet treatments.

The invention is illustrated but not limited by the following examples in which parts and percentages are by weight:

*Example 1*

6.85 parts of 4'-amino-2:4-dinitrodiphenylamine are dissolved in 150 parts of acetone and a solution of 3.0 parts of potassium acetate in 5.0 parts of water is added. The mixture is stirred at 20° C. and a solution of 4.7 parts of cyanuric chloride in 25 parts acetone is added. The product rapidly separates from solution. After 18 hours the product is filtered off, washed with acetone, then water and dried at room temperature. The product so obtained contains 16.85% of chlorine (4'-(dichlorotriazinylamino) - 2:4 - dinitrodiphenylamine contains 16.82% of chlorine). When dispersed in water as a finely divided suspension it dyes nylon in orange shades which are fast to washing and to light.

In place of the 4'-amino-2:4-dinitrodiphenylamine used in this example there may be used 2-nitro-4'-amino-4-acetyldiphenylamine, 2 - nitro-4'-amino-4-cyanodiphenylamine, 2-nitro-4'-amino-4-sulphondimethylamidodiphenylamine, 2 - nitro - 4' - amino - 4-sulfon-beta-hydroxyethylamidodiphenylamine, 4'-amino-2-nitro-4-methanesulfonyldiphenylamine or 4'-amino-2-nitro-4-trifluoromethyldiphenylamine. These compounds may all be prepared from the appropriately 4-substituted 2-nitrochlorobenzene and p-phenylenediamine in ethanol in the presence of anhydrous sodium carbonate. For example, 4'-amino-2:4-dinitro diphenylamine may be prepared as follows:

20 parts of 2:4-dinitrochlorbenzene, 10.8 parts of p-phenylene diamine, 10.6 parts of anhydrous sodium carbonate and 250 parts of ethanol are stirred and boiled under a reflux condenser for 3 hours. The mixture is cooled and the orange crystals which separate are filtered off, washed with ethanol and water and dried.

*Example 2*

8.7 parts of 2-nitro-4'-amino-4-carbonanilidodiphenylamine are dissolved in 150 parts of dioxane, the solution is stirred and cooled to 20° C. and a solution of 3 parts of potassium acetate in 5 parts of water is added. 4.7 parts of cyanuric chloride are dissolved in 25 parts of dioxane and the solution is added to the mixture. When reaction is complete 200 parts of water are added and the mixture is filtered and the residue is washed with water and dried at room temperature. The product so obtained contains 13.25% of chlorine (4'-dichlorotriazinylamino-2-nitro-4-carbonanilidodiphenylamine contains 14.31% of chlorine). The product dyes nylon from an aqueous dispersion to give orange shades of good fastness to light and wet treatments.

In place of 4'-amino-2-nitro-4-carbonanilidodiphenylamine there may be used 4'-amino-2-nitro-4-carboncyclohexyl-amidodiphenylamine, when a similar product is obtained. These compounds may be made by reacting 2-nitro-4-carbonanilidochlorobenzene and 2-nitro-4-carboncyclohexylamidochlorbenzene respectively with p-phenylene diamine in boiling beta-ethoxy ethanol in the presence of anhydrous sodium carbonate.

*Example 3*

6.85 parts of 2:4-dinitro-3'-aminodiphenylamine are dissolved in 150 parts of acetone and a solution of 3 parts of potassium acetate in 5 parts of water is added. The mixture is stirred and 4.7 parts of cyanuric chloride are added and stirring is continued for 18 hours. 200 parts of water are then added and the mixture is filtered and the residue is washed with water and dried at room temperature. The product so obtained contains 14.65% of chlorine (3'-dichlorotriazinylamino - 2:4 - dinitrodiphenylamine contains 16.82% of chlorine). The product dyes nylon from an aqueous dispersion in yellow-orange shades which are fast to washing and to light.

*Example 4*

6.85 parts of 2:4-dinitro-4'-aminodiphenylamine are dissolved in 150 parts of acetone and a solution of 3 parts of potassium acetate in 5 parts of water is added. 4.5 parts of 2:4-dichloro-6-methoxy-1:3:5-triazine are added and the mixture is heated at 30–35° C. until reaction is complete. 200 parts of water are added and the mixture is filtered and the residue is washed with water and dried at room temperature. The product so obtained contains 8.1% of chlorine (4'-methoxychlorotriazinylamino-2:4-dinitrodiphenylamine contains 8.5% of chlorine). The product dyes nylon from an aqueous dispersion in orange shades.

*Example 5*

6.85 parts of 2:4-dinitro-4'-aminodiphenylamine are dissolved in 150 parts of acetone and a solution of 3 parts of potassium acetate in 5 parts of water is added. 6.05 parts of 2:4-dichloro-6-phenoxy-1:3:5-triazine is added and the mixture is stirred at 25° C. for 18 hours. 200 parts of water are added, the mixture is stirred until the oily precipitate solidifies. The precipitate is then filtered off and dried at room temperature. The product so obtained contains 6.4% of chlorine (4'-phenoxychlorotriazinylamino-2:4-dinitrodiphenylamine contains 7.4% of chlorine). The product dyes nylon from an aqueous dispersion in orange shades which are fast to light and washing.

*Example 6*

4.22 parts of the main product of Example 1, 100 parts of acetone, and 1.20 parts of ethanolamine are stirred together for 3 hours at 40° C. The solution obtained is filtered and 100 parts of water are added to the filtrate. The mixture is filtered and the residue is washed with water and dried at room temperature. The product so obtained contains 8.1% of chlorine (4'-(beta-hydroxyethylamino-chloro-triazinylamino)-2:4 - dinitro diphenylamine contains 8.1% of chlorine). The product dyes nylon from aqueous dispersion in orange shades which are of high fastness to washing and to light.

In place of the 1.20 parts of ethanolamine used in this example there may be used the molecularly equivalent amounts of ammonia, methylamine, ethylamine, dimethylamine, diethylamine, N-methylethanolamine, diethanolamine or beta'-hydroxy-beta-ethoxy-ethylamine. Amines which have low boiling points conveniently added to the acetone in the form of a concentrated aqueous solution.

*Example 7*

6.85 parts of 2:4-dinitro-4'-aminodiphenylamine are dissolved in 150 parts of acetone and a solution of 3 parts of potassium acetate in 5 parts of water is added. 5.9 parts of 2:4-dichloro-6-phenyl-1:3:5-triazine are dissolved in 50 parts of acetone and the solution is added to the above mixture at 34° C. The mixture is then stirred for 1 hour at between 35 and 40° C. and the product is precipitated from solution by adding 200 parts of water. The orange product is filtered off, washed with water and dried. It contains 6.9% of chlorine (4'-phenylchlorotriazinylamino-2:4-dinitrodiphenylamine contains 7.65% of chlorine). It dyes nylon from an aqueous dispersion in orange shades.

*Example 8*

4.95 parts of 2-nitro-4-trifluoromethyl-3'-aminodiphenylamine and 4.3 parts of 2:4-dichloro-6-phenoxy-1:3:5-triazine are dissolved in 50 parts of acetone and a solution of 2.5 parts of potassium acetate in 3 parts of water is added. The mixture is stirred for 2 hours at 25° C. 200 parts of water are added and the product is filtered off and washed with water and then methanol. The product so obtained contains 6.8% of chlorine (3'-(phenoxy-chloro-triazinylamino)-2-nitro-4-trifluoromethyldiphenylamine contains 6.65% of chlorine). It dyes nylon from an aqueous dispersion in yellow shades which are fast to washing and to light.

*Example 9*

3.64 parts of 2'-nitro-4'-amino-N-phenylmorpholine and 4.0 parts of 2:4-dichloro-6-phenoxy-1:3:5-triazine are dissolved in 50 parts of acetone and a solution of 1.5 parts of potassium acetate in 3 parts of water is added. The mixture is stirred for 2 hours at room temperature. 100 parts of water are added, whereby an oil separates from the solution. The mixture is stirred for a further 16 hours when this oil solidifies and is filtered off, and washed with water. The product so obtained contains 8.35% of chlorine (4'-(phenoxychlorotriazinyl)-2'-nitro-N-phenylmorpholine contains 8.29% of chlorine). It dyes nylon from an aqueous dispersion in yellow shades of good fastness.

2'-nitro-4'-amino-N-phenylmorpholine may be obtained by reaction of 4-chloro-3-nitroacetanilide with morpholine followed by treatment of the product with aqueous alcoholic hydrochloric acid to hydrolyse the acetyl group. It melts at 131 to 132° C.

Example 10

10 parts of 1-nitro-8-aminoacridone (obtained as described on pages 595 to 597 of the Journal of the Chemical Society, 1947) are dissolved in 200 parts of dimethylformamide. The solution is stirred at 90° C., and there is added a solution (also at 90° C.) of 20 parts of 2:4-dichloro-6-phenoxy-1:3:5-triazine in 100 parts of dimethylformamide. The temperature rises to 110° C. and the product crystallises from the solution whilst still hot. The mixture is cooled to 60° C. and the separated product is filtered off and washed with dimethylformamide and then with water. The product so obtained contains 7.8% of chlorine (1-nitro-8-(chlorophenoxytriazinylamino)acridone contains 7.7% of chlorine). It dyes nylon from an aqueous dispersion in orange shades.

Example 11

4.15 parts of 6-bromo-1:5-dinitro-2-(4'-aminoanilino)naphthalene are dissolved in 50 parts of acetone and the solution is mixed with a solution of 3.7 parts of cyanuric chloride in 20 parts of acetone. The mixture is stirred at 10° C. and a solution of 2.5 parts of potassium acetate in 4 parts of water is added. The mixture is stirred for 30 minutes and then poured into 200 parts of water. The resultant precipitate is filtered off, washed with water and methanol and dried by exposure to air. 5.5 parts of this product are then dissolved in 100 parts of acetone together with 1.9 parts of ethanolamine and the solution is stirred for two hours at 40° C. 100 parts of water are added when the 6-bromo-1:5-dinitro-2-[4'-(4''-chloro-6''-hydroxyethylamino-1''-3''-5'' - triazinyl - 2'' - amino) anilino]naphthalene is precipitated and is filtered off, washed with water and dried by exposure to air. The product so obained contains 13.1% of halogen (expressed as chlorine), whereas the calculated figure is 13.2%. It dyes nylon from an aqueous dispersion in fast orange-brown shades.

6-bromo-1:5-dinitro-2 - (4' - aminoanilino)naphthalene may be obtained in the following way. 1.88 parts of 2:6 - dibromo - 1:5 - dinitronaphthalene obtained as described in the Journal of the Chemical Society, 1952, page 259, 1.1 parts of p-phenylenediamine and 1.8 parts of sodium carbonate are stirred together in 20 parts of boiling alcohol for 4 hours. The mixture is cooled and the brown crystals which separate are filtered off and washed with alcohol and then water and dried. The pure substance, obtained by crystallisation from benzene, forms hexagonal plates melting at 198 to 200° C.

Example 12

5.6 parts of 2-nitro-diphenylamine-4-sulfon-β-aminoethylamide are dissolved in 50 parts of acetone and mixed with a solution of 2.25 parts of potassium acetate in 3 parts of water. A solution of 3.08 parts of cyanuric chloride in 40 parts of acetone is added and the mixture is stirred at 20° C. for 2 hours. The mixture is then poured into 100 parts of water and the product which separates is filtered off, washed with water and dried at room temperature. The product so obtained contains 13.6% of chlorine (2-nitrodiphenylamine-4-sulfon-β-(dichlorotriazinylamino)ethylamide contains 14.7% of chlorine). It dyes nylon from an aqueous dispersion in fast yellow shades.

The 2-nitro-diphenylamine-4-sulfon-β-aminoethylamide used in the above example may be obtained by the interaction of 3-nitro-4-chlorobenzene sulfonchloride with β-chloroethylamine, condensing the resultant 3-nitro-4-chlorobenzene sulfon-β-chloroethylamide with aniline to give 2 - nitrodiphenylamine - 4-sulfon-β-chloroethylamide and then reacting this product with phthalimide and then hydrazine.

Example 13

15.8 parts of 2-nitro-4'-aminodiphenylamine-3',4-bis-(sulfon-β-hydroxyethylamide) (obtained from 4-chloro-3-nitrobenzene sulfon-β-hydroxyethylamide and p-phenylenediamine sulfon-β-hydroxyethylamide) are dissolved in 400 parts of water containing 20 parts of 2 N sodium carbonate and the solution is heated to 80° C. A solution of 9.5 parts of 6-phenoxy-2:4-dichloro-1:3:5-triazine in 50 parts of dioxan is added and the pH is adjusted to 7 at short intervals by addition of 2 N sodium carbonate solution. Reaction is complete in about 10–15 minutes and 12 parts of potassium dihydrogen phosphate and 6 parts of disodium hydrogen phosphate are then added. When these have dissolved the product is precipitated by addition of 100 parts of sodium chloride filtered off and dried at room temperature. The product so obtained dyes wool in fast orange shades.

What we claim is:

Nitro dyestuffs of the formula:

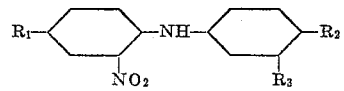

wherein one of $R_2$ and $R_3$ is selected from the class consisting of hydrogen and N-(hydroxy lower alkyl) sulfamyl, and the other of $R_2$ and $R_3$ is a radical of the formula:

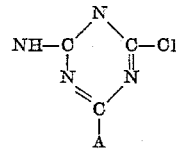

wherein A is selected from the group consisting of chlorine, lower alkoxy, phenyl, lower alkyl phenyl, cyclo alkyl phenyl, phenoxy, lower alkyl phenoxy, cyclo alkyl phenoxy, amino, lower alkylamino, hydroxy-lower alkylamino, C-(hydroxy-lower-alkoxy) lower alkylamino, N,N-di (lower alkyl)amino, N-(hydroxy lower alkyl)-lower alkylamino, and N,N-di(hydroxy-lower alkyl)-amino; $R_1$ is an organic substituent selected from the group of radicals consisting of nitro, acetyl, cyano, sulfondimethylamido, sulfon - β - hydroxy-ethylamido, methane sulfonyl, trifluoromethyl, carbonanilido, carbon-cyclohexyl-amido, and morpholino.

References Cited in the file of this patent

UNITED STATES PATENTS

| | | |
|---|---|---|
| 2,059,800 | Laska et al. | Nov. 3, 1936 |
| 2,167,804 | Gubler et al. | Aug. 1, 1939 |
| 2,824,093 | Benz et al. | Feb. 18, 1958 |

FOREIGN PATENTS

| | | |
|---|---|---|
| 457,535 | Great Britain | Nov. 30, 1936 |
| 558,390 | Belgium | Oct. 14, 1957 |

OTHER REFERENCES

Giua et al.: Gazz. Chim. Ital., vol. 53, pages 48 to 52 (1923).